United States Patent [19]

Kim et al.

[11] Patent Number: 4,970,044
[45] Date of Patent: Nov. 13, 1990

[54] COMPRESSION MOLDING USING INSULATING FILMS

[75] Inventors: Bang M. Kim; Donald E. Woodmansee, both of Schenectady, N.Y.

[73] Assignee: General Electric Company, Schenectady, N.Y.

[21] Appl. No.: 377,657

[22] Filed: Jul. 10, 1989

Related U.S. Application Data

[63] Continuation of Ser. No. 176,116, Mar. 30, 1988, abandoned.

[51] Int. Cl.[5] ................. B29C 43/20; B29C 43/52
[52] U.S. Cl. .................... 264/266; 264/316; 264/320; 264/348; 425/89; 249/112
[58] Field of Search ............ 264/322, DIG. 65, 266, 264/264, 265, 320, 316, 348; 425/89; 249/112

[56] References Cited

U.S. PATENT DOCUMENTS

| | | | |
|---|---|---|---|
| 2,263,792 | 11/1941 | Wood | 264/266 |
| 3,274,298 | 4/1966 | Utiger | 264/322 |
| 3,681,483 | 8/1972 | Moore | 264/322 |
| 3,883,632 | 5/1975 | Petrochko | 264/322 |
| 4,306,856 | 12/1981 | Arppol | 264/DIG. 65 |
| 4,372,900 | 2/1983 | Doerfling | 264/DIG. 65 |
| 4,390,489 | 6/1983 | Segal | 264/322 |
| 4,416,716 | 11/1983 | Ichikawa | 264/322 |
| 4,440,702 | 4/1984 | Susnjara | 264/322 |
| 4,595,551 | 6/1986 | Maurer | 264/322 |

Primary Examiner—Jay H. Woo
Assistant Examiner—Jeremiah F. Durkin, II
Attorney, Agent, or Firm—William H. Steinberg; James C. Davis, Jr.; Paul R. Webb, II

[57] ABSTRACT

Deformable insulating films are used as mold liners in a compression molding process. The film delays the initial cooling of the preheated thermoplastic charge. The film also serves as a plastic charge carrier and convection barrier during transport of the plastic charge from a heating unit into the compression molding press.

14 Claims, 4 Drawing Sheets

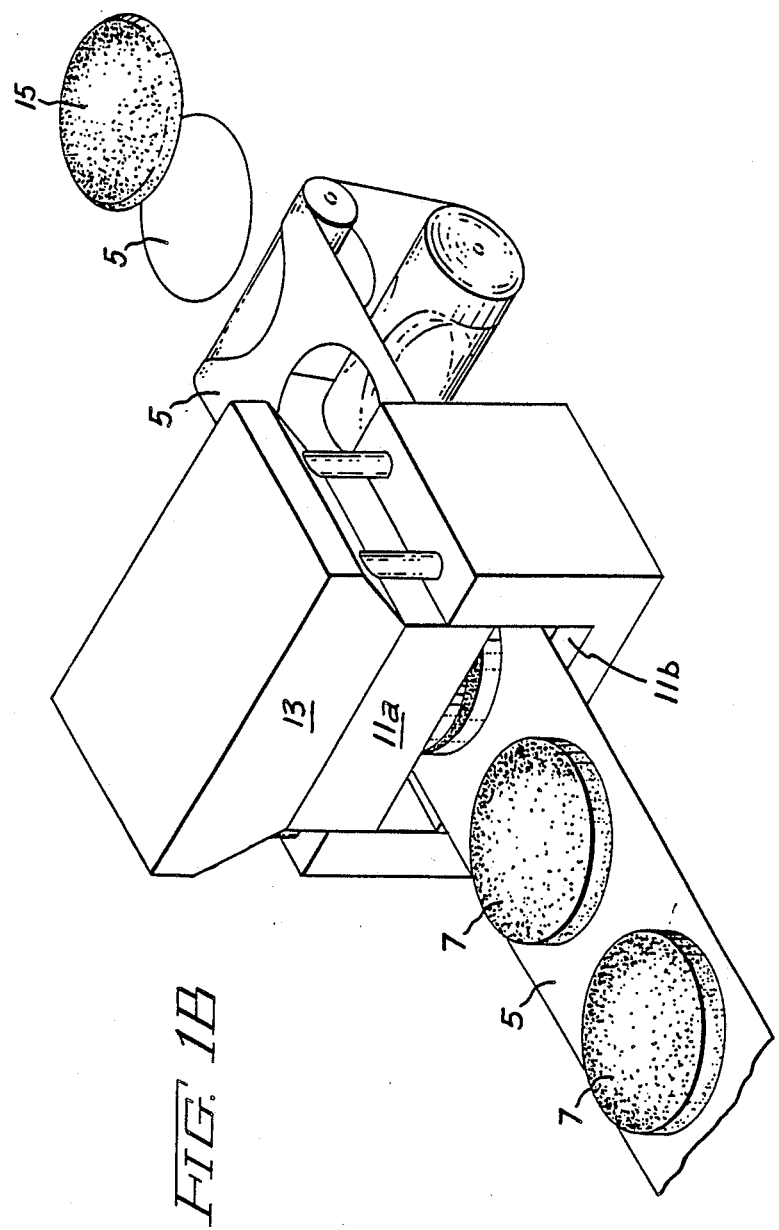

– 4,970,044 –

COMPRESSION MOLDING USING INSULATING FILMS

This application is a continuation of application Ser. No. 176,116, filed Mar. 30, 1988, now abandoned.

CROSS REFERENCE TO RELATED APPLICATIONS

This application is related to copending applications entitled "Compression Molding of Composite Parts on Hot Mold Surfaces With a Short Cycle Time", Ser. No. (07/361,464), and "Multilayer Composite Mold Structure For Molding on Hot Surfaces", Ser. No. (07/435,639), both assigned to same assignee as the present invention. Ser. No. (07/435,639), is hereby incorporated by reference.

BACKGROUND OF THE INVENTION

The present invention is related to a method of compression molding plastics

Present practice in compression molding neat plastics and plastic composites is to feed preheated sheets of the plastic material into a press, close the press and simultaneously deform the hot plastic sheet into the desired component shape while cooling it. Since the plastic in contact with the mold cools quickly, the forces needed to deform the plastic can be enormous, particularly for large area components.

Another problem with flow forming plastics and particularly plastic components in compression molding is achieving smooth surfaces As soon as the plastic sheet blank enters the mold it begins cooling, even before the press closes and therefore before the plastic has been molded. This rapid cooling not only increases molding pressures required to flow form the plastic, but also gives rise to surface roughness. When composite materials are used, the rapid cooling results in exposed fibers, porous areas, and visible boundaries of the sheet blank between resin frozen at the surface and the newly formed resin areas produced when molten resin in the composite sheet interior moves to the surface. Changing the mold temperature greatly increases cycle time since the mold requires large masses of metal to contain the stresses of the molding operation and these large masses take time to heat and cool.

It is an object of the present invention to provide a method of compression molding thermoplastic sheets which reduces the required molding pressure and therefore reduces press size, which is particularly significant in large part fabrication.

It is another object of the present invention to provide a method of compression molding which results in finished products with smooth surfaces.

It is a further object of the present invention to provide a method of compression molding thermoplastic parts which maintains short cycle times and therefore high throughput for each press.

It is another object of this invention to provide a means for transporting plastic sheet blanks into the mold.

It is yet another object of the present invention to provide a method of compression molding which results in reduced thermal decomposition of the thermoplastic resins.

SUMMARY OF THE INVENTION

In one aspect of the present invention a method of compression molding using insulating films is provided comprising heating a thermoplastic charge to above its glass transition temperature, if it is an amorphous material, or above its melting point if it is a crystalline material The heated charge is then transported on an insulating film between the mold halves of a press. The mold halves are closed and the thermoplastic charge is flow formed and the insulating film is deformed and pressed against the mold surface. The film acts an insulating layer to reduce the cooling rate of the plastic charge when it is placed in the mold, so that the surface of the plastic charge remains hot while the plastic fills the mold in less than a second or two. However, the film is sufficiently conducting that the charge can be cooled over several tens of seconds.

BRIEF DESCRIPTION OF THE DRAWING

The subject matter which is regarded as the invention is particularly pointed out and distinctly claimed in the concluding portion of the specification. The invention however, both as to organization and method of operation, together with further objects and advantages thereof, may best be understood by reference to the following description taken in conjunction with the accompanying drawing figures in which:

FIGS. 1A and 1B are isometric representations of the steps of compression molding plastic in accordance with the present invention.

DETAILED DESCRIPTION OF THE INVENTION

Figure 1A:
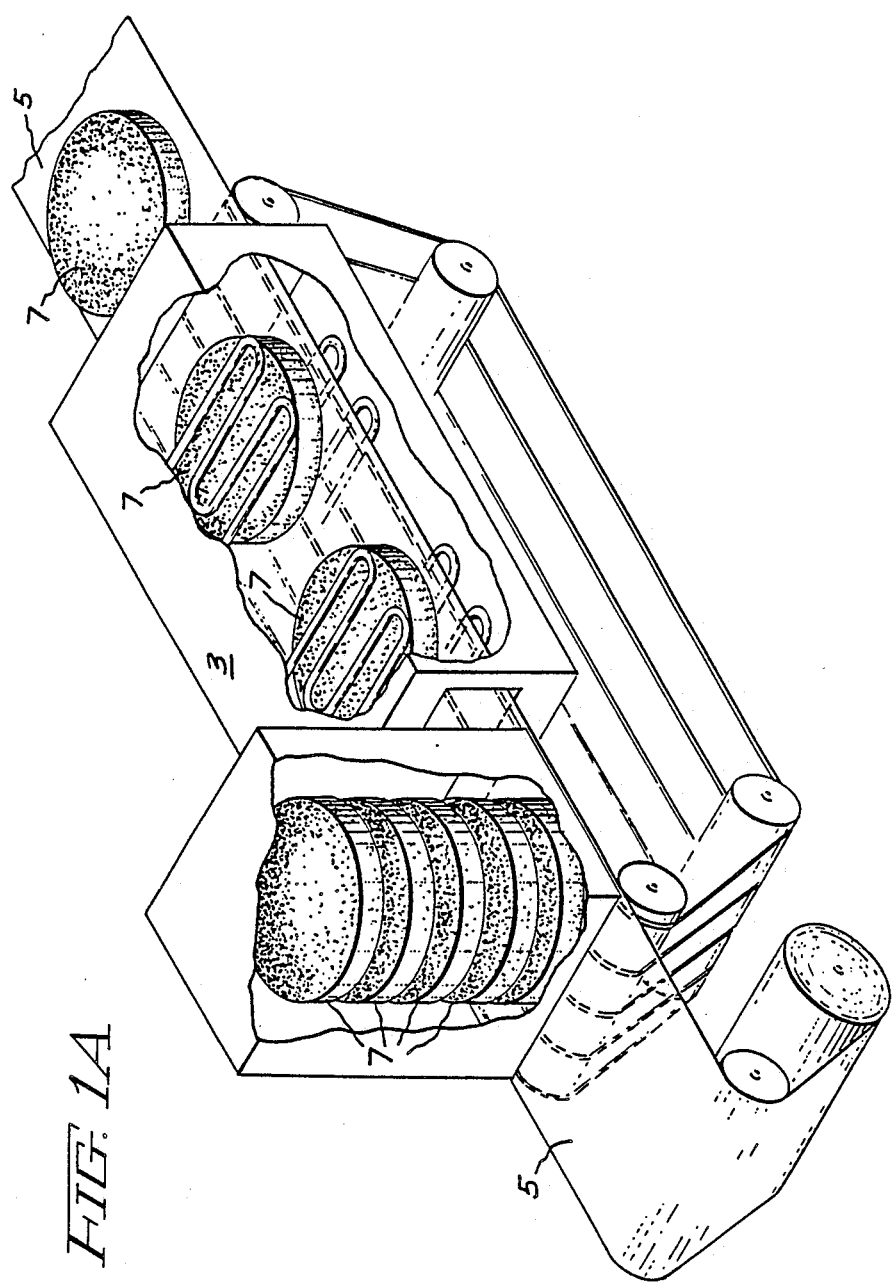

Referring now to the drawing wherein like numerals indicate like elements throughout and more particularly to FIGS. 1A and 1B thereof, a travelling oven 3 is shown. A deformable insulation film 5 carries a charge of plastic material 7 to be molded through the oven. The plastic charge can comprise a neat thermoplastic or a fiber reinforcing material in a thermoplastic matrix. The film 5 comprises a plastic having a high melting point with low heat conductivity such as polytetrofluoroethylene or thermoplastic polyimides such as ULTEM ® polyetherimide available from GE, other high temperature thermoplastics including KAPTON polyimide from Dupont, SKYBOND polyimide from Monsanto, TORLON polyimide from Amoco and PPQ 401 from Whittaker. High temperature thermoset polymers which can alternatively be used as film materials, include for example, polyimides epoxies, and diallyisophthalate. The film can alternatively comprise a high temperature elastomer such as silicon rubber or VITON ® fluoroelastic available from Dupont. The high melting point assures the integrity of the film during the heating and subsequent flow forming stage Plastic charges 7, although shown in the shape of a disk in FIG. 1A and 1B can have any shape suitable for the subsequent molding step, are transported through the traveling oven 3 on film 5, with the film and charge being heated at the same time. The charge is heated sufficiently so that center of the charge material is substantially above the glass transition temperature if an amorphous thermoplastic or above the melting point if a crystalline thermoplastic, while the film is not heated above its glass transition or above its melting point. The film transports the charge from the oven to between the mold halves 11a and 11b in press 13. The mold halves are cooled such as by a cooling liquid flowing in passageways in the mold halves (not shown). The film selected depends on the glass transition temperature or melting point of the thermoplastic charge and ability of the film to deform against the mold surface. The film material needs to retain its strength so that it does not tear when pulled through the oven 3 and then through the press 13.

During molding the film deforms to the shape of the face of the lower mold half 11b, but the film is not molten and does not flow. The film provides sufficient insulation so that the plastic charge does not immediately assume the temperature of the cool mold during the early stages of flow forming. Rather, the insulating property of the film keeps the charge hot so that it remains molten and flows into all parts of the mold. However, the insulating value of the film is not so high that heat cannot be extracted during later stages of the molding cycle. The time-average rate of cooling during the overall cycle can be kept the same as it would be without the film by reducing the mold temperature from the values that would have been used, in situations where the film was not present. If insulating films were not used a cooler mold could not be used because the plastic charge would be cooled too rapidly and could not be properly flow formed to fill the mold. The instantaneous cooling rates with the insulating film are lower initially and similar or higher during the end of the cooling period than they would be without the film and the mold at a higher temperature.

When the press 13 closes, the mold halves 11a and 11b cut the film material 5. The press opens and the molded part and film are removed together. The film can then be removed easily from the molded part 15 when the plastic charge material does not adhere to the film. When a 1/64" silicon rubber sheet serving as the film with an ⅛" sheet of XENOY Resin ® blend of bisphenol A polycarbonate and polybutylene terephthalate on top serving as the plastic charge was heated in a 600° F. oven until the center of the Xenoy sheet reached 550° F. and then compression molded, the silicon rubber was easily removed from XENOXY Resin after molding. Similarly when a 1/64" polytetrafluorethelene film was used with an ⅛" XENOY Resin sheet, the PTFE film was also easily removed.

While only a single sheet of film is shown in FIGS. 1A and 1B, a second sheet can be used on top of the plastic charge during the transport of the charge to the press and subsequent molding. Alternatively, a second sheet can be used on top of the plastic charge during heating, transporting and molding. The second sheet would help to further reduce thermal decomposition of the plastic charge resin by reducing the exposure to air of the hot resin. The second film also reduces cooling of the resin during transport from the sheet blank heater to the press. The reduced cooling of the charge would allow a lower preheat temperature, or less heating time, or both. Two films, one on top and one below would also further reduce the required molding pressure by keeping the plastic charge surfaces at an elevated temperature longer during the press closing. The two films could comprise different materials one or both of which could be selected to bond to the plastic charge during molding or they both could be removable.

The foregoing has addressed insulating films that are utilized both for transport and for molding. It might be beneficial to use one set of films for transport blanks to the mold and yet another set of films for transporting the blanks actually into the mold press and subsequently being deformed with the part during molding. The transfer of the blank from the transport films to the forming films would be accomplished just outside the press.

Figure 2A:
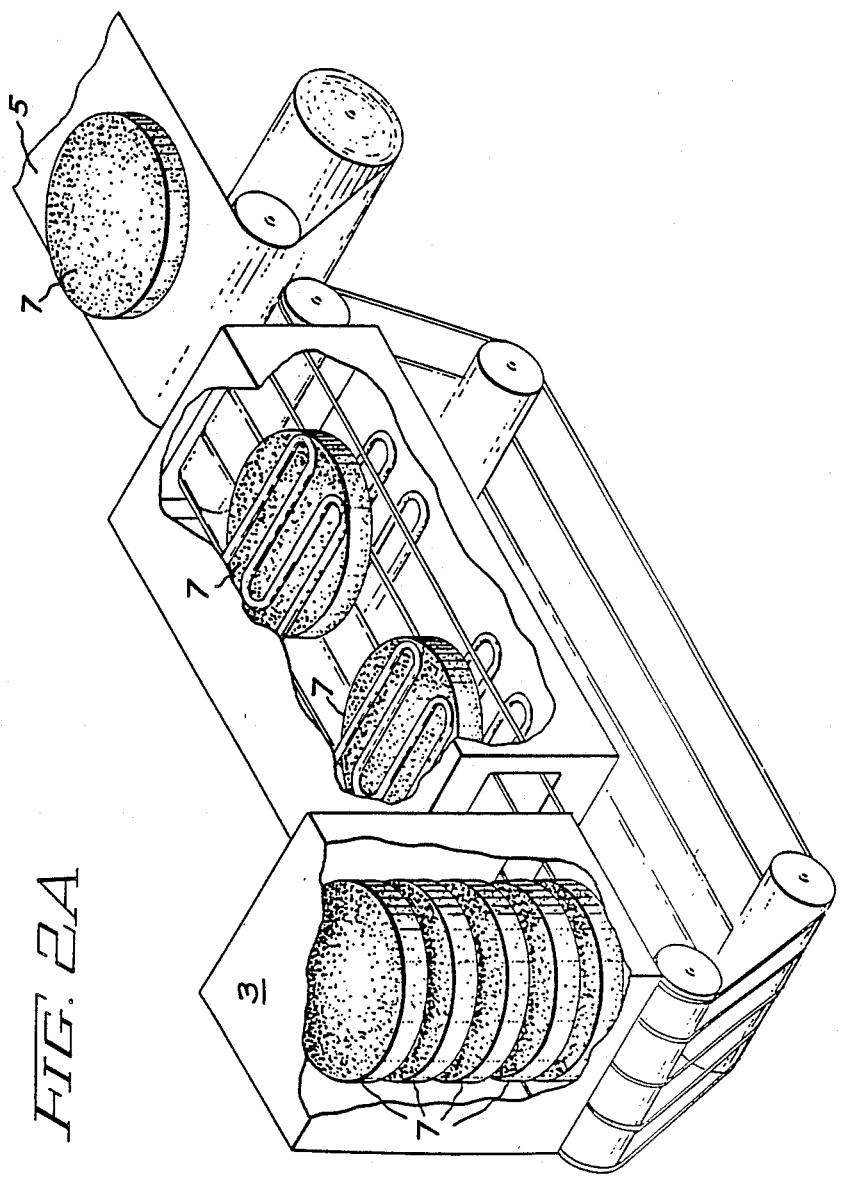
FIGS. 2A and 2B are isometric representations of another embodiment in accordance with the present invention.
Figure 2B:
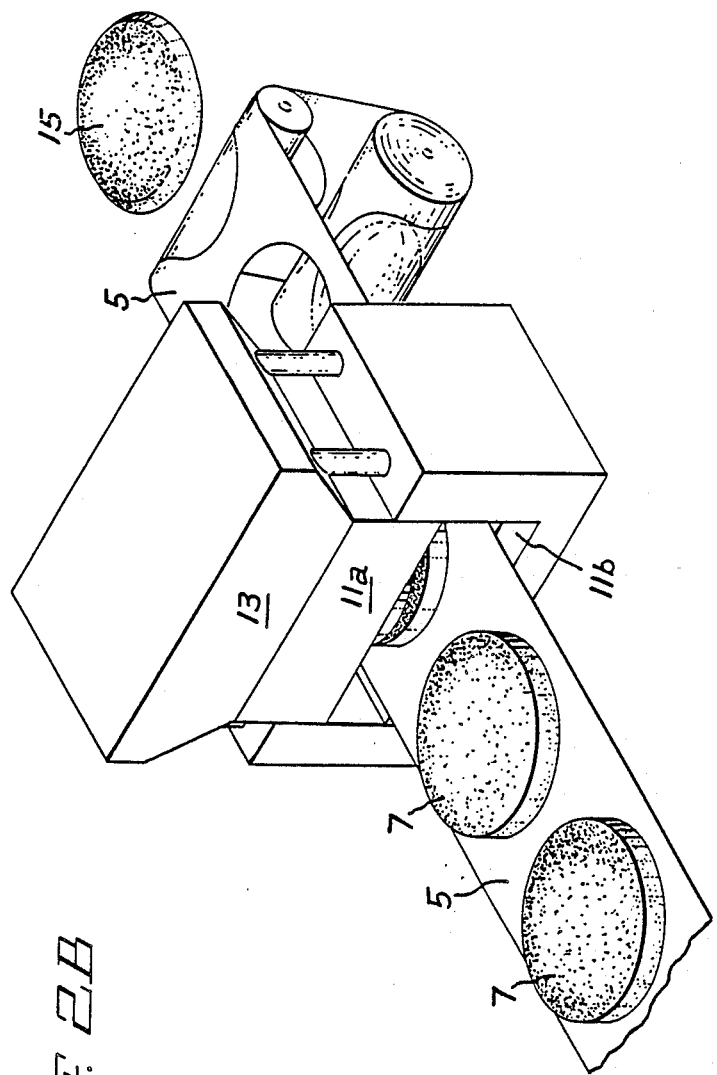

Referring now to FIGS. 2A and 2B, another embodiment of the present invention is shown. The plastic charges 7 are shown being heated in the travelling oven 3 and then being transported on an insulating film 5 to and between the mold halves 11a and 11b of the press 13. Some insulating films cannot withstand the oven temperatures which are needed to properly heat certain plastic charges, but can withstand the heat of the charge when it emerges from the oven. The insulating film transports the heated charge to the press where the film is deformed by the lower mold half 11b. Some combination of insulating films and plastic charges bond well together and laminate products can be formed. For example, if a charge of XENOY plastic is heated in an oven to 600° F. and then transported on 1/64" film of ULTEM ® polyetherimid to the press and molded, the XENOXY resin would bond to the ULTEM polyetherimid forming a laminate.

While only a single insulating film is shown in FIGS. 2A and 2B, two films can be used; one above and one below the heated charge when it emerges from the oven. The two films can comprise two different films with one bonding to the plastic charge during molding and one not. Alternatively, both films could either both bond or not bond.

In those situations where the plastic or elastomeric films in the embodiments of FIG. 1 and FIG. 2 are not sufficiently insulating at the desired film thickness, composite films can be employed using plastic or elastomeric films surrounding more conventional insulating materials such as fiber mats.

The desired thermal conductivity of the insulating film should be in the range of $5 \times 10^{-3}$ to $1 \times 10^{-4}$ cal./cm.$^2$ sec. C/cm. where C stands for degrees centigrade. The thickness in centimeters (cm) of the insulating film can be determined from the thermal diffusivity, $\alpha$, of the film material according to equation 1, where the constants 1 and 25 have the units of $1/\sqrt{s}$.

$$\sqrt{\alpha} < \text{thickness} < 25 \sqrt{\alpha} \tag{1}$$

Thermal diffusivity is defined by equation 2, $$\alpha = \frac{k}{c\rho} \tag{2}$$

where k is the thermal conductivity of the film, c is the specific heat and $\rho$ is the density, with all the elements in CGS units.

The lower thickness limit in equation 1, is imposed by the desire to minimize sheet cooling over the approximately 1 second time it takes to flow form the part. The upper thickness limit prescribes an addition of no more than two minutes to the entire cooling cycle. In fact, it may be possible to maintain the same cooling times as are accomplished without the use of these films when the mold temperatures are controlled at lower values.

The foregoing has described a method of compression molding which results in finished products with smooth surfaces and short cycle times. The method reduces the required mold pressure and reduces the thermal decomposition of the thermoplastic resins in the plastic charge being molded.

While the invention has been particularly shown and described with reference to several embodiments thereof, it will be understood by those skilled in the art that various changes in form and detail may be made without departing from the spirit and scope of the invention.

What we claim is:

1. A method of compression molding using an insulating film to achieve a smooth surface on parts being molded, comprising the steps of:
   placing a thermoplastic charge on a plastic insulating film, said film having a thermal conductivity in the range of $5 \times 10^{-3}$ to $1 \times 10^{-4}$ cal/cm sec C, said film having a thickness in centimeters defined by the equation $\sqrt{\alpha} < \text{thickness} < 25\sqrt{\alpha}$, where $\alpha$ is the thermal diffusivity of the film in CGS units;
   heating the thermoplastic charge to above its glass transition temperature if it is an amorphous material or above its melting point if it is a crystalline material;
   transporting the heated charge on the insulating film to between the cooled mold halves of a press; and
   closing the mold halves to flow form the thermoplastic charge and to deform the film, the film acting as an insulating layer to reduce the cooling rate of the plastic charge when it is placed in the cooled mold so that the plastic charge remains hot and flows during mold closing.

2. The method of claim 1 further comprising the steps of:
   removing the film and molded part from the mold; and
   separating the film from the part.

3. The method of claim 1 further comprising the step of removing the film and molded part from the mold with the film laminated to the part.

4. The method of claim 1 wherein said step of heating includes heating the thermoplastic charge on a film in an oven.

5. The method of claim 1 wherein said step of transporting the heated charge occurs between two insulating film.

6. The method of claim 1 wherein said film has a higher glass transition temperature or melting temperature than the thermoplastic charge.

7. The method of claim 6 wherein said film is a material selected from the group consisting of thermoplastics, and thermoset polymers.

8. The method of claim 7 further comprising the steps of removing the molded part and film from the mold with the film laminated to the part.

9. The method of claim 6 wherein said film comprises an elastomer.

10. A method of compression molding using insulating film to achieve smooth surfaces on parts being molded, comprising the steps of:
    placing a thermoplastic charge between two insulating films, each of said films having a thermal conductivity in the range of $5 \times 10^{-3}$ to $1 \times 10^{-4}$ cal/cm sec C, said films each having a thickness in centimeters defined by the equation $\sqrt{\alpha} < \text{thickness} < 25\sqrt{\alpha}$, where $\alpha$ is the thermal diffusivity of the film in CGS units;
    heating the thermoplastic charge between two insulating films in an oven to above its glass transition temperature if it is an amorphous material or above its melting point if it is a crystalline material;
    transporting the heated charge between the two insulating films to between the cooled mold halves of a press; and
    closing the mold halves to flow form the thermoplastic charge and deform the films, the films acting as insulating layers to reduce the cooling rate of the plastic charge when it is placed in the cooled mold, so that the plastic charge remains hot and flows during mold closing.

11. The method of claim 10 further comprising the steps of:
    removing the film and molded part from the mold; and
    separating at least one film layer from the part.

12. The method of claim 11 wherein said film has a higher glass transition temperature or melting temperature than the thermoplastic charge.

13. The method of claim 12 wherein said film is a material selected from the group consisting of thermoplastics, and thermoset polymers.

14. The method of claim 12 wherein at least one of said films comprises an elastomer.

* * * * *